United States Patent
Javaid et al.

(10) Patent No.: US 11,095,016 B2
(45) Date of Patent: Aug. 17, 2021

(54) VEHICLE ROOF HAVING CONDUCTIVE COATING FOR WIRELESS COMMUNICATION

(71) Applicants: Hyundai Motor Company, Seoul (KR); Kia Motors Corporation, Seoul (KR)

(72) Inventors: Bilal Javaid, Ada, MI (US); Michael Forbes, Superior Township, MI (US)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 16/383,936

(22) Filed: Apr. 15, 2019

(65) Prior Publication Data

US 2020/0328493 A1    Oct. 15, 2020

(51) Int. Cl.
| | |
|---|---|
| *H01Q 1/12* | (2006.01) |
| *B60J 7/043* | (2006.01) |
| *C09D 5/24* | (2006.01) |
| *C09D 7/40* | (2018.01) |
| *H01Q 1/32* | (2006.01) |
| *C03C 17/06* | (2006.01) |
| *C03C 17/23* | (2006.01) |

(52) U.S. Cl.
CPC ............ *H01Q 1/1271* (2013.01); *B60J 7/043* (2013.01); *C09D 5/24* (2013.01); *C09D 7/70* (2018.01); *H01Q 1/3275* (2013.01); *C03C 17/06* (2013.01); *C03C 17/23* (2013.01); *C03C 2217/70* (2013.01); *C03C 2217/948* (2013.01)

(58) Field of Classification Search
CPC ..... H01Q 1/1271; H01Q 1/3275; B60J 7/043; C09D 7/70; C09D 5/24; C03C 17/23; C03C 2217/70; C03C 17/06; C03C 2217/948
USPC .......................................... 434/713; 343/713
See application file for complete search history.

(56) References Cited

U.S. PATENT DOCUMENTS

| | | | |
|---|---|---|---|
| 5,898,407 A | | 4/1999 | Paulus et al. |
| 6,255,624 B1 | * | 7/2001 | Boaz ........................ H05B 3/84 219/203 |
| 6,768,467 B2 | | 7/2004 | Jordan |
| 8,018,568 B2 | | 9/2011 | Allemand et al. |
| 9,350,071 B2 | | 5/2016 | Kobayashi et al. |
| 2003/0112190 A1 | * | 6/2003 | Baliarda ................ H01Q 1/325 343/713 |
| 2003/0127452 A1 | * | 7/2003 | Gerhardinger ........ A47F 3/0434 219/497 |
| 2010/0165436 A1 | * | 7/2010 | Voss ........................ B32B 17/10 359/238 |
| 2013/0092676 A1 | * | 4/2013 | Offermann ............... H05B 3/86 219/203 |

(Continued)

*Primary Examiner* — Don P Le
(74) *Attorney, Agent, or Firm* — Mintz Levin Cohn Ferris Glovsky and Popeo, P.C.; Peter F. Corless (57) ABSTRACT

A vehicle and a method for enhancing wireless communication for the vehicle are provided. The vehicle includes a glass panel that is disposed on a roof of the vehicle and an electrically conductive coating applied to the glass panel. The conductive coating is electrically connected to an electrically conductive portion of a vehicle body. The method for enhancing wireless communication for the vehicle includes coating a glass panel of a vehicle roof with an electrically conductive coating and electrically connecting the conductive coating to an electrically conductive portion of a vehicle body.

16 Claims, 10 Drawing Sheets

(56) References Cited

U.S. PATENT DOCUMENTS

| | | | |
|---|---|---|---|
| 2013/0141289 A1* | 6/2013 | Vortmeier | H01Q 1/50 343/711 |
| 2014/0097636 A1* | 4/2014 | Snider | B60J 3/02 296/97.8 |
| 2014/0234578 A1* | 8/2014 | Decraye | C03C 17/3668 428/138 |
| 2015/0222242 A1* | 8/2015 | Dai | H01Q 1/325 333/33 |
| 2015/0224856 A1* | 8/2015 | Snider | B60J 7/0015 296/152 |
| 2015/0367782 A1* | 12/2015 | Mannheim Astete | B32B 17/00 349/12 |
| 2019/0081392 A1* | 3/2019 | Vendt | H01Q 1/3275 |
| 2019/0152194 A1* | 5/2019 | Schmalbuch | B32B 17/10165 |
| 2019/0319333 A1* | 10/2019 | Dai | H01Q 1/1271 |

* cited by examiner

FIG. 1

Related Art

VEHICLE ROOF HAVING CONDUCTIVE COATING FOR WIRELESS COMMUNICATION

TECHNICAL FIELD

The present disclosure relates to a roof for a vehicle, and more particularly, to a glass panel of the roof having an electrically conductive coating for improved wireless communication.

BACKGROUND

Generally, vehicles today include various systems that utilize wireless communication technologies. For example, AM/FM radios, a terrestrial digital broadcasting, a satellite digital radio, a vehicle navigation system, a keyless entry system, a tire pressure monitoring system (TPMS), an electric toll collection (ETC) system, a cellular phone, a mobile wireless network, and a wireless local area network (LAN) for vehicle are included in the vehicles and require wireless communication. For mobile radio and satellite communication such as global positioning satellite (GPS) or the like, the frequently bands include an AM range (e.g., about 150 kHz to 30 MHz), a VHF range for radio and television reception (e.g., about 30 MHz to 300 MHz), and a UHF range for television reception and for remote control devices (e.g., about 300 MHz to 2 GHz). Further, a vehicle-to-everything (V2X) communication is an emerging technology that is based on wireless communication standards such as 4G LTE that primarily utilizes the 5.9 GHz band and 5G that utilizes higher frequencies (i.e., shorter wavelengths).

Since various wireless communication technologies are used for road safety, traffic efficiency, and energy savings, wireless communication capabilities of the vehicles are becoming important. Therefore, antenna systems for efficient and reliable wireless communication capabilities are desirable. To receive and transmit wireless signals, an antenna is typically disposed within the vehicle or on a surface of the vehicle. A common location for an antenna is the rear portion of the roof of the vehicle. For example, an antenna for the 5.9 GHz band is typically disposed at the rear portion of the vehicle roof, and in particular, in a shark-fin antenna configuration.

Some vehicles include a glass panel on the roof to allow light to enter a passenger compartment portion of the vehicles. Further, some glass panels can be opened and closed to allow air as well as light to enter the passenger compartment. These glass panels are typically referred to as a sunroof or a moonroof. Some glass panels include two or more glass panes, which cover the roof area over the front seat and the back seat. These larger, and typically openable, glass panels are also referred to as a panoramic moonroof or a panoramic glass roof.

Figure 1:
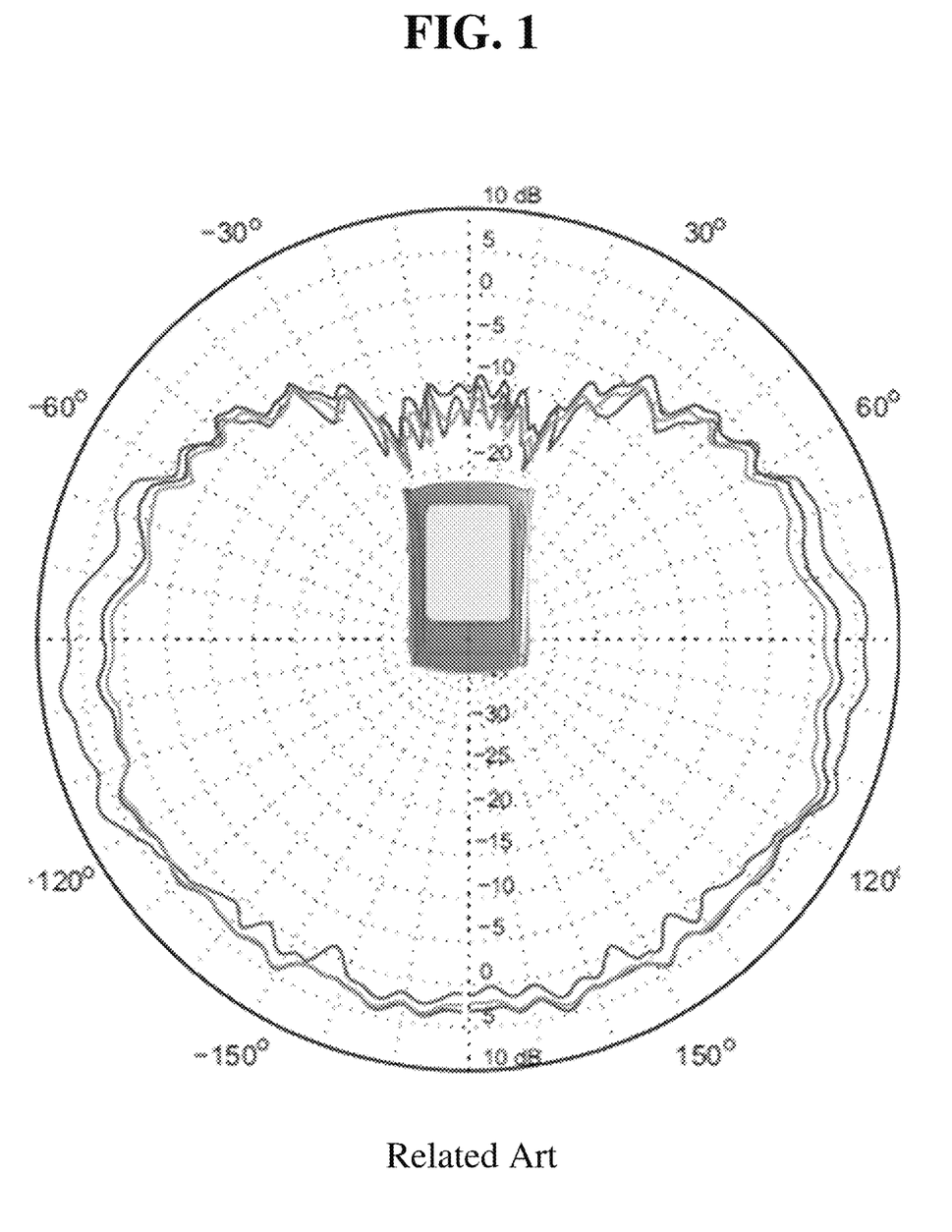
FIG. 1 illustrates transmission strength of an antenna installed behind a conventional glass panel of the related art.

When a 5.9 GHz band antenna is installed at the rear of the panoramic moonroof, the radiation from the antenna is absorbed by the glass panel or penetrates through the glass panel and into the interior space of the vehicle. Accordingly, the gain of the antenna is significantly reduced toward the front of the vehicle. FIG. 1 shows that the conventional glass panel of the related art reduces the antenna gain in the forward direction by about 10 dB compared to the rearward direction due to the glass panel, which results in a reduced communication range especially in the forward direction. A technology to improve the antenna performance in the presence of a glass panel is solicited.

One solution previously developed in the art to address the above-mentioned problem is installing an additional antenna system at the front portion of the vehicle. However, the additional front antenna increases cost and complexity of the vehicle system. In other applications, antennas mounted on glass portions of the vehicles have been used to eliminate an external antenna for reducing aerodynamic drag or for aesthetic purposes. However, these glass-mounted antennas are typically patch-type antennas that function for particular frequency bands of 200 to 400 MHz and are mounted inside the glass portions, and therefore, are unable to provide solutions to the wireless communication at higher frequencies.

SUMMARY

The present disclosure provides a vehicle having a glass panel on a roof thereof with an electrically conductive coating applied to the glass panel to improve wireless communication.

In accordance with an aspect of the present disclosure, a vehicle may include a glass panel disposed on a roof of the vehicle and an electrically conductive coating applied to the glass panel. In particular, the conductive coating may be electrically connected to an electrically conductive portion of a vehicle body.

The conductive coating may be electrically connected to the electrically conductive portion of the vehicle body along an entire outer periphery of the glass panel. In particular, the conductive coating may be electrically connected to the vehicle body via conductive bristles, and a gap between the conductive coating and the vehicle body may be filled with a filling material or a glue to fix the glass panel to the vehicle body. The conductive coating may extend to and wrap around a peripheral edge of the glass panel. Further, the conductive coating may be transparent or translucent. In particular, the conductive coating may include silver nanowire or indium tin oxide.

In some implementations, the conductive coating may be applied to an entire surface of the glass panel. Alternatively, the conductive coating may be applied to a portion of the glass panel. A thickness of the conductive coating may gradually decrease toward a forward direction of the vehicle body. Further, the glass panel may include a plurality of glass panes, and the conductive coating may be applied to at least one of the plurality of glass panes. In particular, the plurality of glass panes may include a first glass pane and a second glass pane, and the first glass pane may be configured to be retracted and disposed over the second glass pane. The conductive coating may be applied on a bottom surface of the first glass pane and on a top surface of the second glass pane, and when the first glass pane is retracted, a vertical gap between the first glass pane and the second glass pane may form a waveguide to guide radiation in an operating frequency band of wireless communication.

In accordance with another aspect of the present disclosure, a vehicle may include an antenna disposed on a vehicle roof for transmitting and receiving wireless signals, a glass panel disposed on the vehicle roof, and an electrically conductive coating applied to the glass panel. In particular, the conductive coating may be electrically connected to an electrically conductive portion of a vehicle body. A thickness of the conductive coating may gradually decrease from a surface of the glass panel proximate to the antenna toward a surface of the glass panel distant from the antenna.

In accordance with yet another aspect of the present disclosure, a method for enhancing wireless communication for a vehicle may include coating a glass panel of a vehicle roof with an electrically conductive coating and electrically connecting the conductive coating to an electrically conductive portion of a vehicle body. When the glass panel includes a retractable first glass pane and a stationary second glass pane, the method may further include coating each of a bottom surface of the first glass pane and a top surface of the second glass pane with the conductive coating. Accordingly, when the first glass pane is retracted, a vertical gap between the first glass pane and the second glass pane may form a waveguide to guide radiation in an operating frequency band of wireless communication.

Notably, the present disclosure is not limited to the combination of the elements as listed above and may be assembled in any combination of the elements as described herein. Other aspects of the disclosure are disclosed infra.

BRIEF DESCRIPTION OF THE DRAWINGS

A brief description of each drawing is provided to more sufficiently understand drawings used in the detailed description of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Advantages and features of the present disclosure and a method of achieving the same will become apparent with reference to the accompanying drawings and exemplary embodiments described below in detail. However, the present disclosure is not limited to the exemplary embodiments described herein and may be embodied in variations and modifications. The exemplary embodiments are provided merely to allow one of ordinary skill in the art to understand the scope of the present disclosure, which will be defined by the scope of the claims. Accordingly, in some embodiments, well-known operations of a process, well-known structures, and well-known technologies will not be described in detail to avoid obscure understanding of the present disclosure. Throughout the specification, same reference numerals refer to same elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
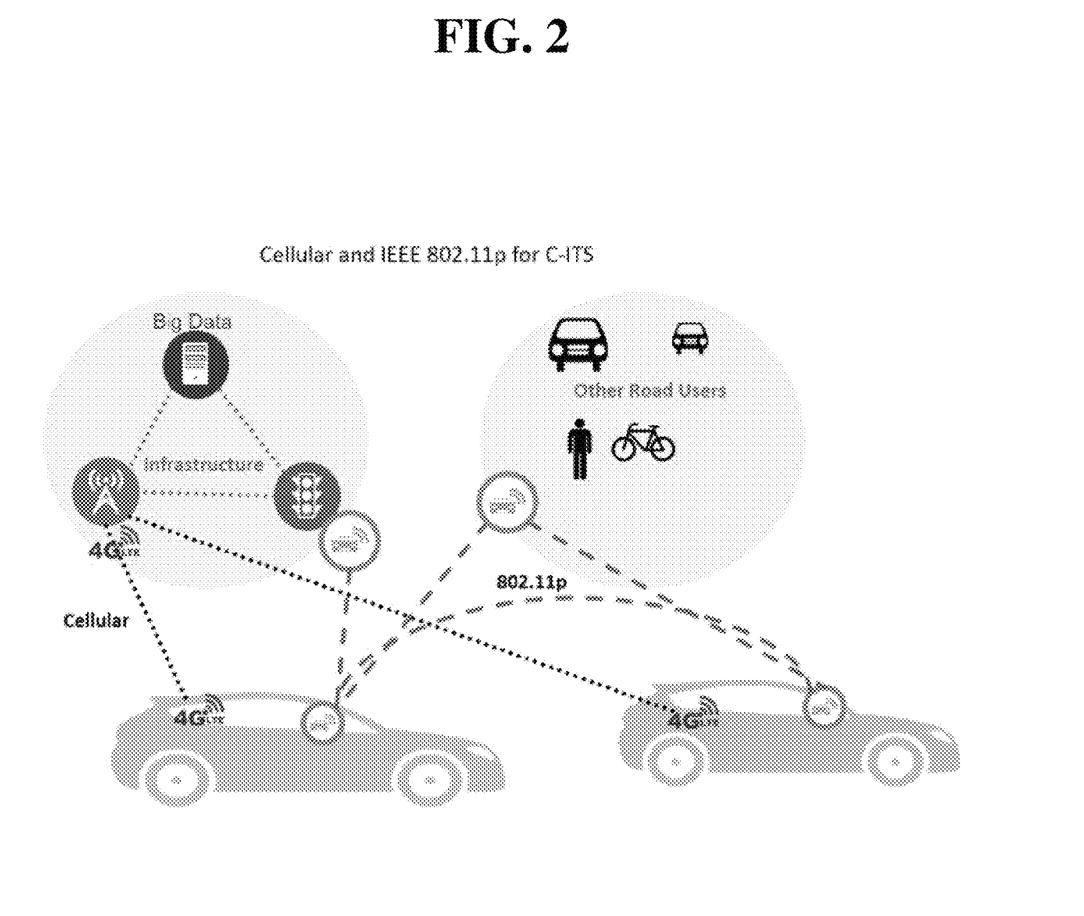
FIG. 2 illustrates an example of wireless communication for a vehicle according to an exemplary embodiment of the present disclosure.

An aspect of the present disclosure provides a vehicle, and more particularly, a glass panel of a vehicle roof having an electrically conductive coating for improved wireless communication. The electrically conductive coating applied to a glass panel may provide a larger ground plane for monopole antennas and may reflect radiation off the roof and prevent the radiation from being absorbed into the glass panel to improve antenna gain for wireless communication. FIG. 2 illustrates an example of wireless communication for vehicles with improved antenna performance for a vehicle-to-everything (V2X) technology implemented with more reliable antenna systems to wirelessly connect to other vehicles, infrastructure, and/or to other road users. Hereinbelow, a vehicle according to exemplary embodiments of the present disclosure will be described in detail with reference to the accompanying drawings.

Figure 3:
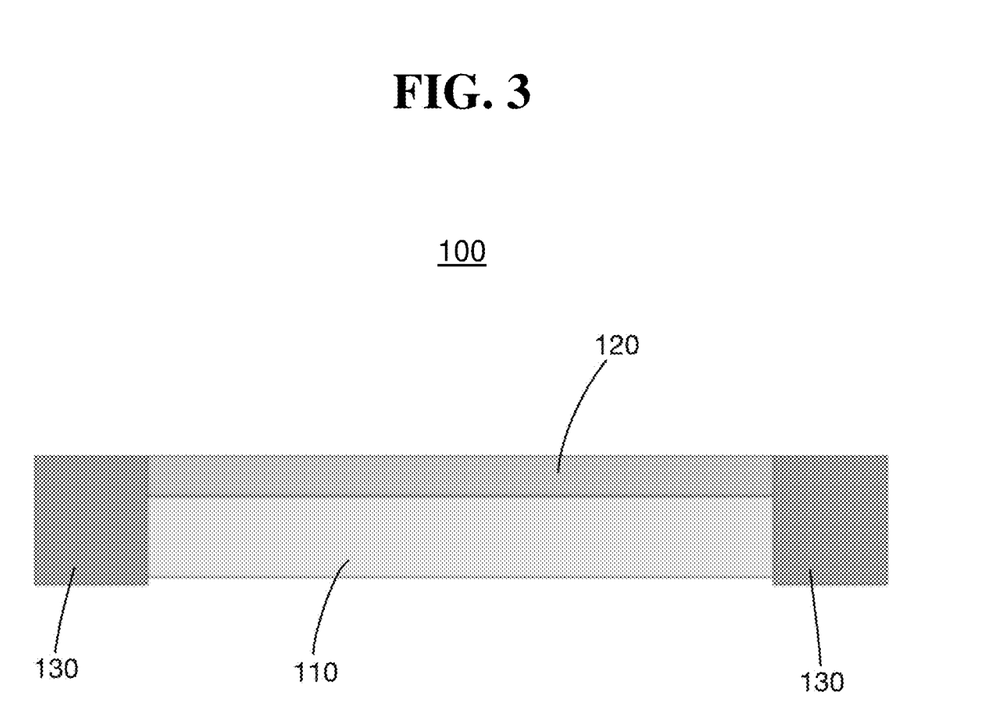
FIG. 3 is a schematic view of a glass panel having a conductive coating according to an exemplary embodiment of the present disclosure.

FIG. 3 is a schematic view of a conductive glass panel for a vehicle according to an exemplary embodiment of the present disclosure. Referring to FIG. 3, a vehicle roof 100 according to an exemplary embodiment of the present disclosure may include a glass panel 110 and an electrically conductive coating 120 applied to the glass panel 110. The conductive coating 120 may be electrically connected to an electrically conductive portion 130 of a vehicle body. Further, the conductive coating 120 may be electrically connected to the electrically conductive portion 130 of the vehicle body along an entire outer periphery of the glass panel 110. The conductive coating 120 may be applied on a top surface of the glass panel 110.

The glass panel 110 may be a panoramic glass roof (e.g., panoramic sunroof or panoramic moonroof) of the vehicle. An antenna for wireless transmission and reception may be included in the vehicle adjacent to the glass panel. In particular, the antenna may be a monopole antenna and may be configured to transmit and receive in a 5.9 GHz frequency band. However, the frequency band is not limited to the 5.9 GHz band, and may include other frequency bands such as, for example, 37 GHz for a 5G communication. The monopole 5.9 GHz band antenna may require a ground plane to operate. Therefore, by applying a conductive coating on the glass panel and electrically connecting the conductive coating to the vehicle body, an area of the ground plane may be increased, and the antenna performance may be improved.

Figure 4A:
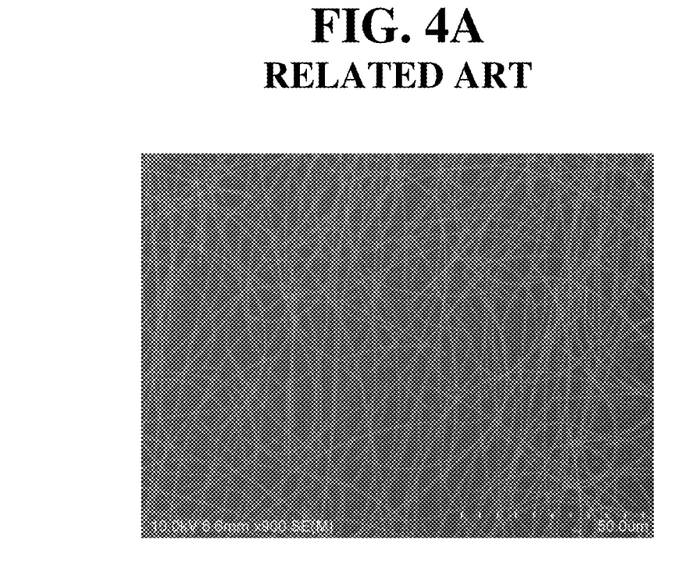
FIGS. 4A and 4B show microscopic pictures of a conductive coating that includes silver nanowires according to the related art.
Figure 4B:
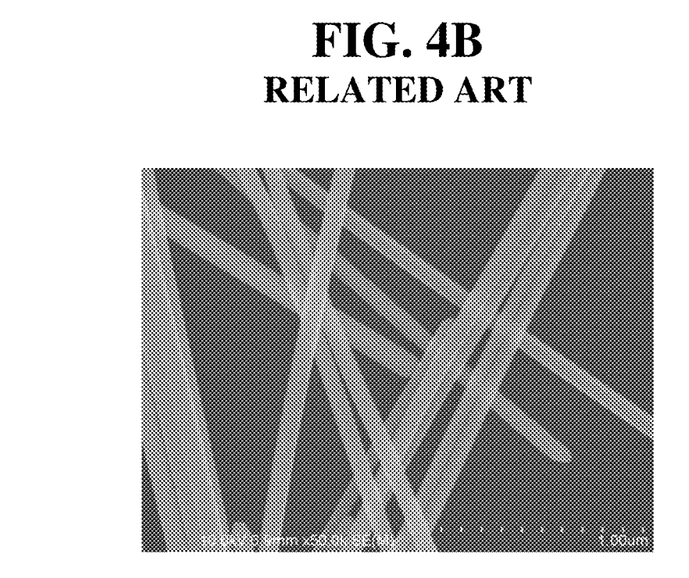

The conductive coating 120 may include a silver nanowire film or indium tin oxide (no) film. However, the conductive coating material is not limited thereto, and may include other materials that are transparent or translucent to visible light while electrically conductive. For example, a transparent film of silver nanowire shown in FIGS. 4A and 4B may be used. Referring to FIGS. 4A and 4B of the related art, the silver nanowire film may include thin rods (e.g., about 100 nm in diameter) of silver that overlap or mingle with each other. The film may be tuned for a balance between electrical performance and light transmittance by adjusting diameter, length, concentration, and/or the like of the silver nanowires included in the film. The electrical performance may be improved as the density of the silver nanowire is increased.

However, as the density of the silver nanowire is increased, the light transmittance may be reduced. Depending on applications, a tinted sunroof may be desired, in which case the light transmittance may be adjusted by varying the density of the silver nanowire in the film. An exemplary configuration of the silver nanowire film may include silver nanowires of about 10 mm in length that are included by a concentration of about 0.5% by weight in a film of clear polymer substrate such as, for example, silicone elastomer having a thickness of about 0.7 mm. This exemplary configuration of the silver nanowire film may perform as an electromagnetic reflective material to prevent the antenna radiation from being absorbed (e.g., penetrating) into the glass panel.

Figure 5:
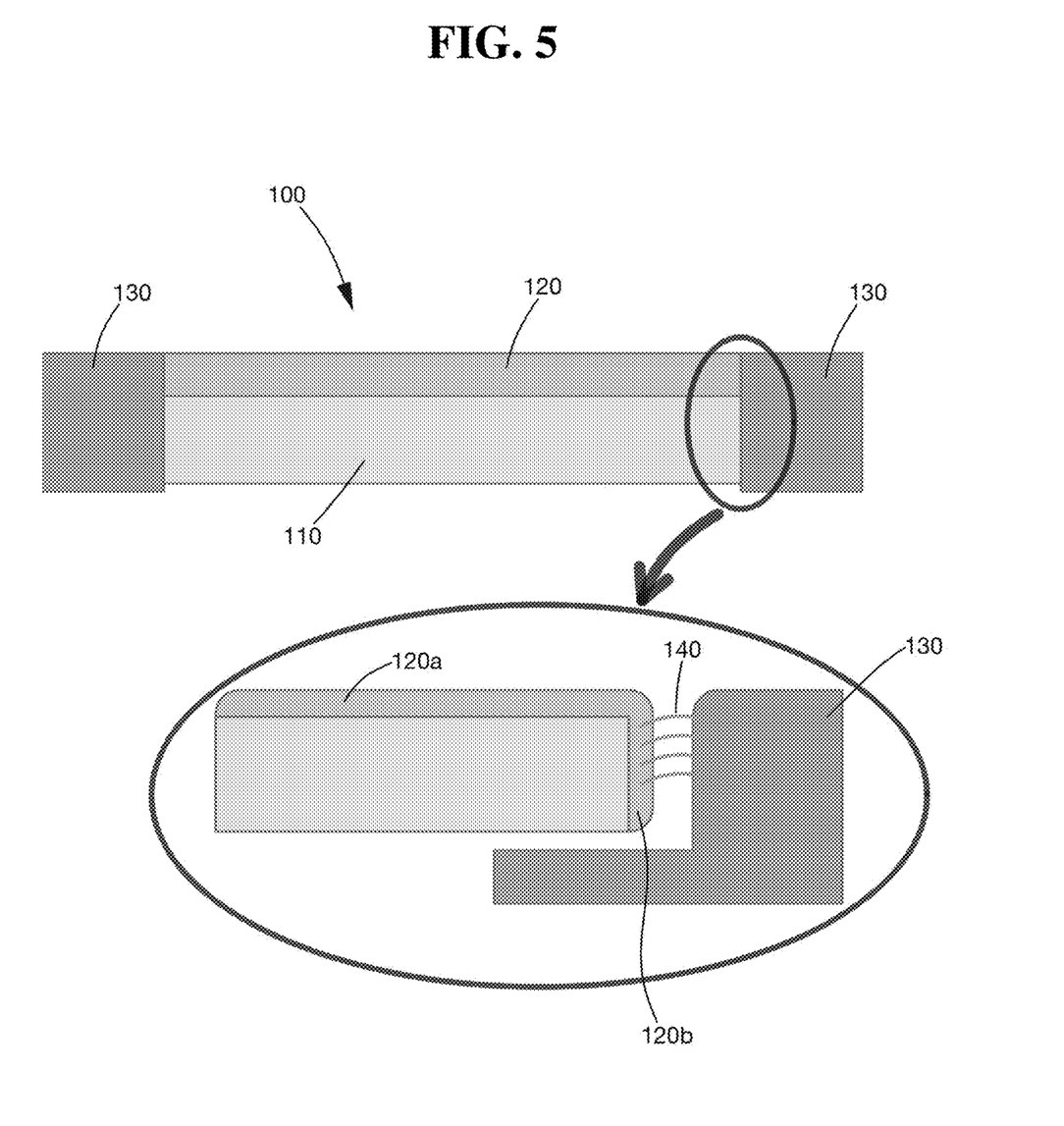
FIG. 5 is a schematic view of a glass panel having a conductive coating according to an exemplary embodiment of the present disclosure.

FIG. 5 schematically illustrates a configuration in which the conductive coating 120 is electrically connected to the electrically conductive portion 130 of the vehicle body. The conductive coating 120 applied on the glass panel 110 may be electrically connected to the electrically conductive portion 130 of the vehicle body via a plurality of electrically conductive bristles 140. In particular, the conductive coating 120 may include a top portion 120a that is applied to a top surface of the glass panel 110 and a side portion 120b that wraps around a peripheral edge of the glass panel 110. A plurality of electrically conductive bristles 140 may be disposed between the side portion 120b of the conductive coating 120 and the electrically conductive portion 130 of the vehicle body to form an electrical conduction path therebetween. The conductive bristles 140 may be fixed or attached to the vehicle body and be configured to abut the conductive coating 120 of the glass panel 110. Alternatively, the conductive bristles 140 may be fixed or attached to the conductive coating 120 of the glass panel 110 and be configured to abut the conductive portion 130 of the vehicle body.

Further, a gap between the side portion 120b of the conductive coating 120 and the vehicle body may be filled with a filling material or a glue to fix the glass panel to the vehicle. Automotive urethane may be used as the glue material, but the present disclosure is not limited thereto. Other filling or glue materials known in the art may be used. Moreover, the vehicle body is not limited to steel, and may include other materials such as, for example, aluminum alloys or carbon-fiber reinforced polymers (FRP).

Due to the above-described configuration, the conductive layer may be electrically grounded to the vehicle body and serve as an extension to the ground plane of the monopole antenna. Furthermore, radiation energy may be prevented from being absorbed by the glass. Accordingly, the performance of the monopole antenna may be improved.

Figure 6:
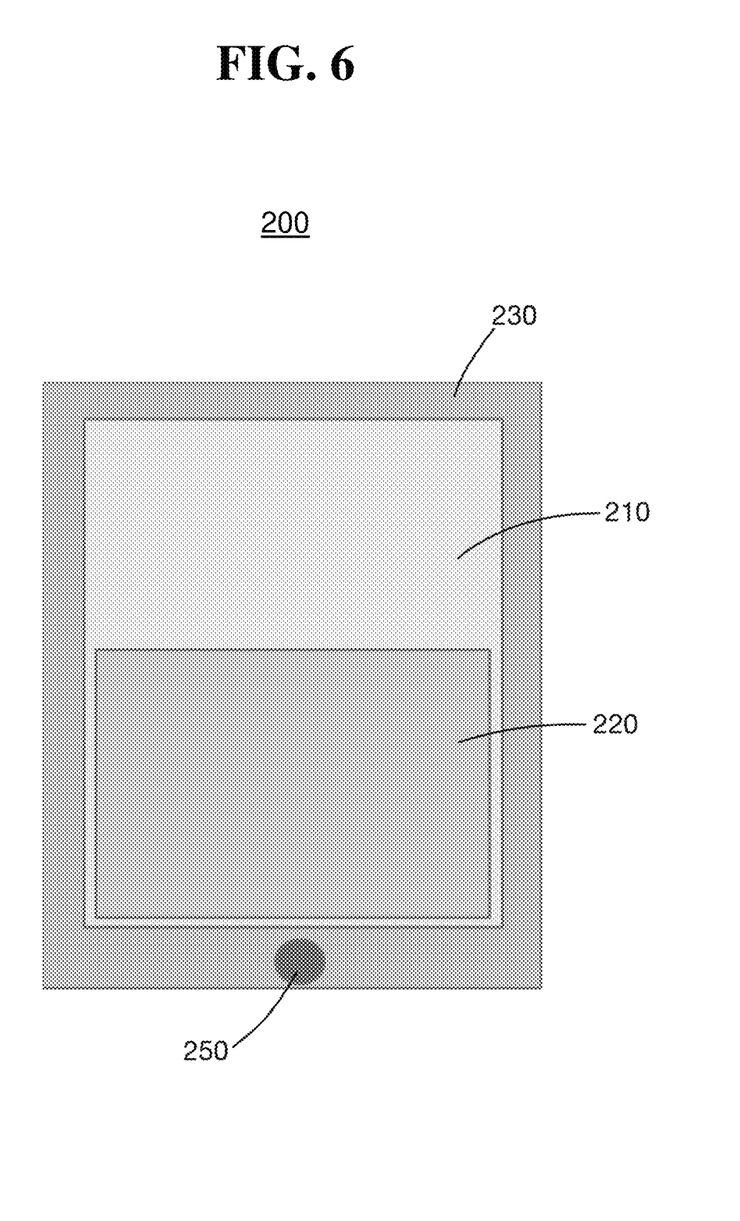
FIG. 6 is a schematic view of a glass panel that includes a conductive coating applied to a portion of the glass panel according to an exemplary embodiment of the present disclosure.

In the foregoing exemplary embodiment, the conductive coating 120 may be applied to an entire surface of the glass panel 110. However, the present disclosure is not limited thereto. Referring to FIG. 6, a vehicle roof 200 according to an exemplary embodiment of the present disclosure may include an antenna 250 and a glass panel 210. In particular, a conductive coating 220 may be applied to a portion of the glass panel 210 and be electrically connected to an electrically conductive portion 230 of a vehicle body. Since the impact of the conductive coating 220 is more significant in the vicinity of the antenna 250, the conductive coating 220 may be applied to an area proximate to the antenna 250. For example, when the antenna 250 is disposed at the rear portion of the vehicle roof, the conductive coating 220 may be applied to a rear portion of the glass panel 210 that is proximate to the antenna 250.

In addition, when the conductive coating is applied to an entire surface of the glass panel, a thickness of the conductive coating may be varied across the glass panel. For example, the thickness of the conductive coating may be greater in the area proximate to the antenna than in an area distant from the antenna. For example, when the antenna is disposed at the rear portion of the vehicle roof, the conductive coating may have a thickness that is greater in the rear portion than in the front portion. In other words, the thickness may be gradually reduced from the rear portion toward the front portion of the vehicle.

Figure 7:
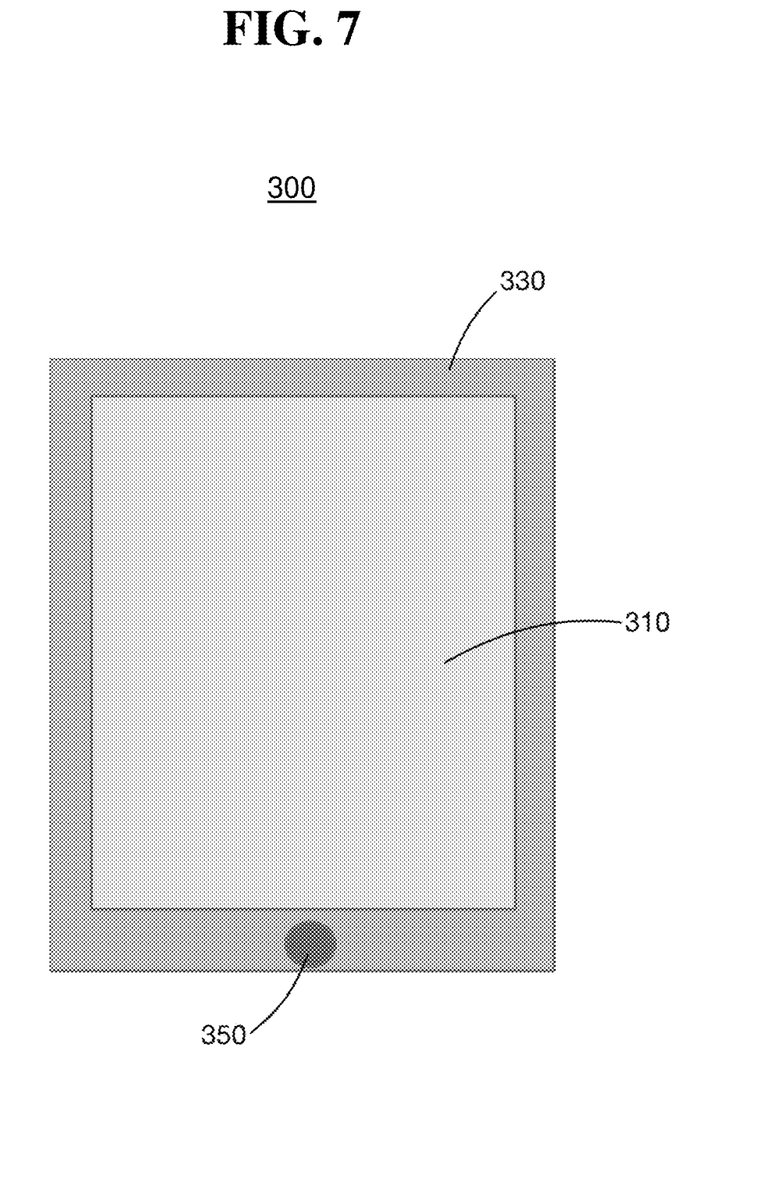
FIG. 7 is a schematic view of a glass panel with a single glass pane according to an exemplary embodiment of the present disclosure.

Moreover, the vehicle roof according to the present disclosure may be implemented in various configurations depending on the shape, size, and/or configuration of the panoramic glass roof. Referring to FIG. 7, a vehicle roof 300 according to an exemplary embodiment of the present disclosure may include an antenna 350 and a glass panel 310 that is electrically connected to an electrically conductive portion 330 of a vehicle body. In particular, the glass panel 310 may include a single glass pane.

Figure 8:
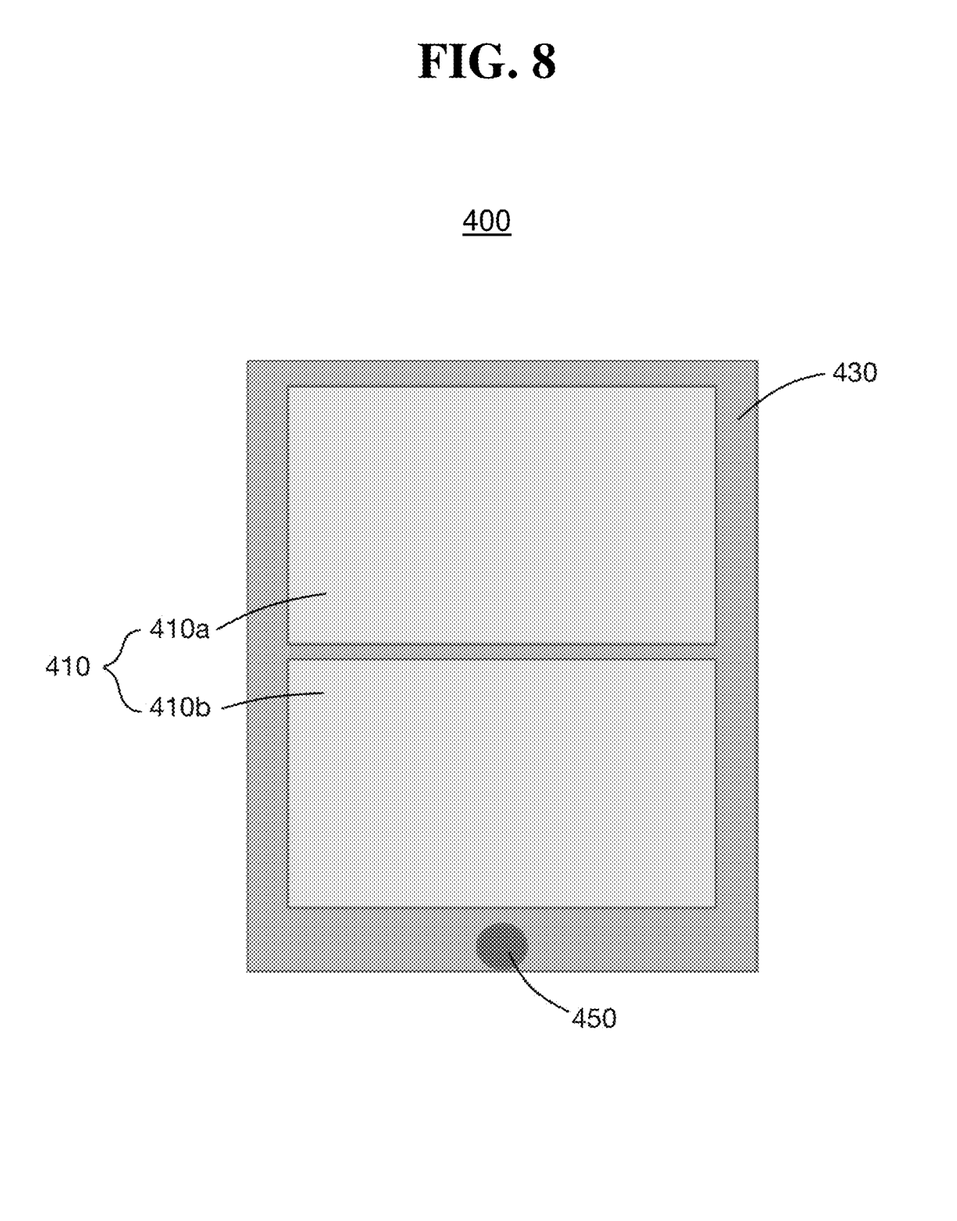
FIG. 8 is a schematic view of a glass panel with a first glass pane and a second glass pane according to an exemplary embodiment of the present disclosure.

Referring to FIG. 8, a vehicle roof 400 according to an exemplary embodiment of the present disclosure may include an antenna 450 and a glass panel 410 that is electrically connected to an electrically conductive portion 430 of a vehicle body. In particular, the glass panel 410 may include a plurality of glass panes. Two glass panes are illustrated in FIG. 8 as an example, but the present disclosure is not limited thereto. The glass panel may include more than two glass panes. When the glass panel includes a plurality of glass panes, the conductive coating may be applied to at least one of the glass panes. Alternatively, the conductive coating may be applied to all of the glass panes. For example, the glass panel 410 may include a first glass pane 410a and a second glass pane 410b. The first glass pane 410a may be disposed toward the front of the vehicle, and the second glass pane 410b may be disposed toward the rear of the vehicle. The conductive coating may be applied to the first glass pane 410a, the second glass pane 410b, or both. As described above, since the impact of the conductive coating is more significant in the vicinity of the antenna 450, the conductive coating may be applied to the second glass pane 410b that is proximate to the antenna 450.

In some implementations, the panoramic glass roof may be configured as a retractable (e.g., openable) glass roof. For example, referring to FIGS. 9A and 9B, the first glass pane 510a may be configured to be retracted as indicated by an arrow in FIG. 9A and disposed over the second glass pane 510b. In the retracted position shown in FIG. 9B, the first glass pane 510a may be disposed over and above the second glass pane 510b, and the first glass pane 510a and the second glass pane 510b may be spaced apart by a vertical gap 560. In the retractable glass roof configuration, a first conductive coating 520a may be applied on a bottom surface of the first glass pane 510a, and a second conductive coating 520b may be applied to a top surface of the second glass pane 510b.

Figure 9A:
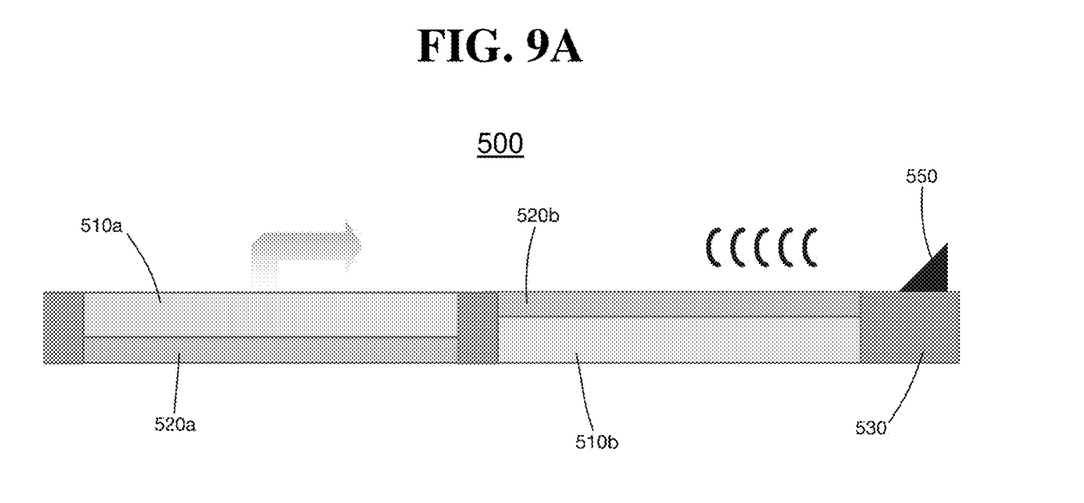
FIG. 9A is a schematic view of a glass panel that includes a retractable first glass pane and a stationary second glass pane according to an exemplary embodiment of the present disclosure.
Figure 9B:
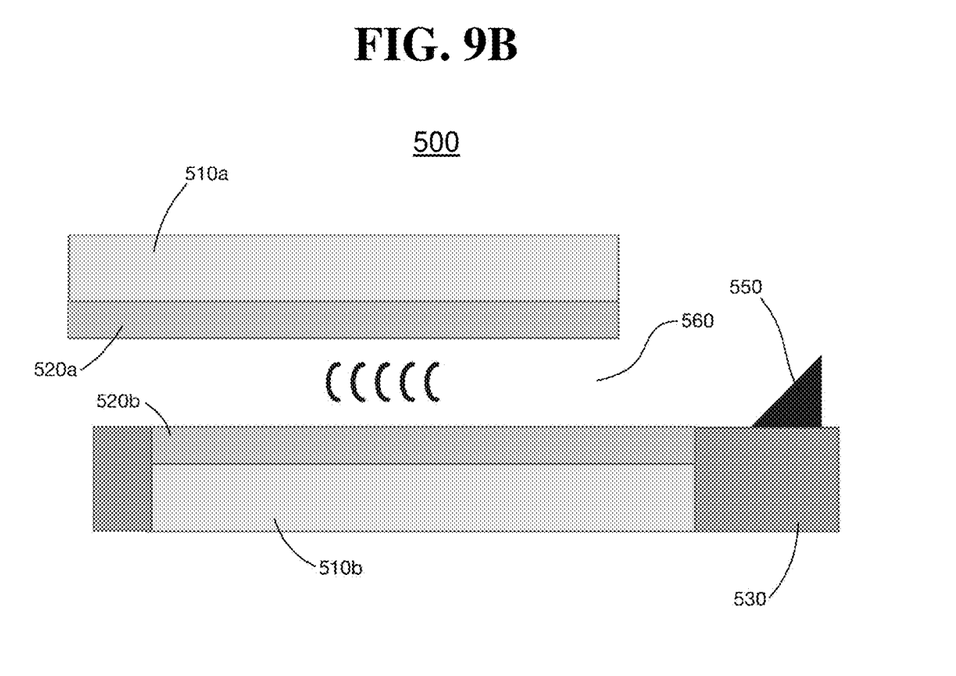
FIG. 9B illustrates a waveguide formed between a conductive coating applied to a bottom surface of the first glass pane and a conductive coating applied to a top surface of the second glass pane according to an exemplary embodiment of the present disclosure.

In particular, the vertical gap 560 defined by a space between the first conductive coating 520a and the second conductive coating 520b may form a waveguide to guide a radiation emitted by the antenna 550. To enhance the transmission performance of the antenna 550, the vertical gap 560 may be determined based on an operating frequency of the wireless system. Further, the conductive coating materials and the vertical gap may be determined based on the operation frequency of the wireless system. The vertical gap may also be determined to form a waveguide that corresponds to frequencies for the 5.9 GHz band, but the present disclosure is not limited thereto and may include various other frequency bands.

The retractable glass roof configuration is not limited to the above-described configuration. Alternatively, the first glass pane 510a may be configured to be retracted and disposed under and below the second glass pane 510a. In this configuration, the first conductive coating 520a may be applied on a top surface of the first glass pane 510a, and a second conductive coating 520b may be applied on a bottom surface of the second glass pane 510b to form a waveguide between the top surface of the first glass pane 510a and the bottom surface of the second glass pane 510b. In some implementations, the first glass pane 510a may be disposed toward the front of the vehicle, and the second glass pane 510b may be disposed toward the rear of the vehicle. Alternatively, the first glass pane 510a may be disposed toward the rear of the vehicle, and the second glass pane 510b may be disposed toward the front of the vehicle.

In another aspect of the present disclosure, a method for enhancing wireless communication for a vehicle with a glass panel is provided. The method may include coating the glass panel with an electrically conductive coating and electrically connecting the conductive coating to an electrically conductive portion of the vehicle. When the method of enhancing wireless communication is applied to a vehicle with a retractable panoramic glass roof which includes a retractable first glass pane and stationary second glass pane, the method may further include coating a bottom surface of the first glass pane with the conductive coating and coating a top surface of the second glass pane with the conductive coating. Accordingly, a vertical gap may be formed between the first glass pane and the second glass pane, when the first glass pane is retracted and disposed over the second glass pane, to form a waveguide for an operation frequency of the wireless communication system.

Figure 10:
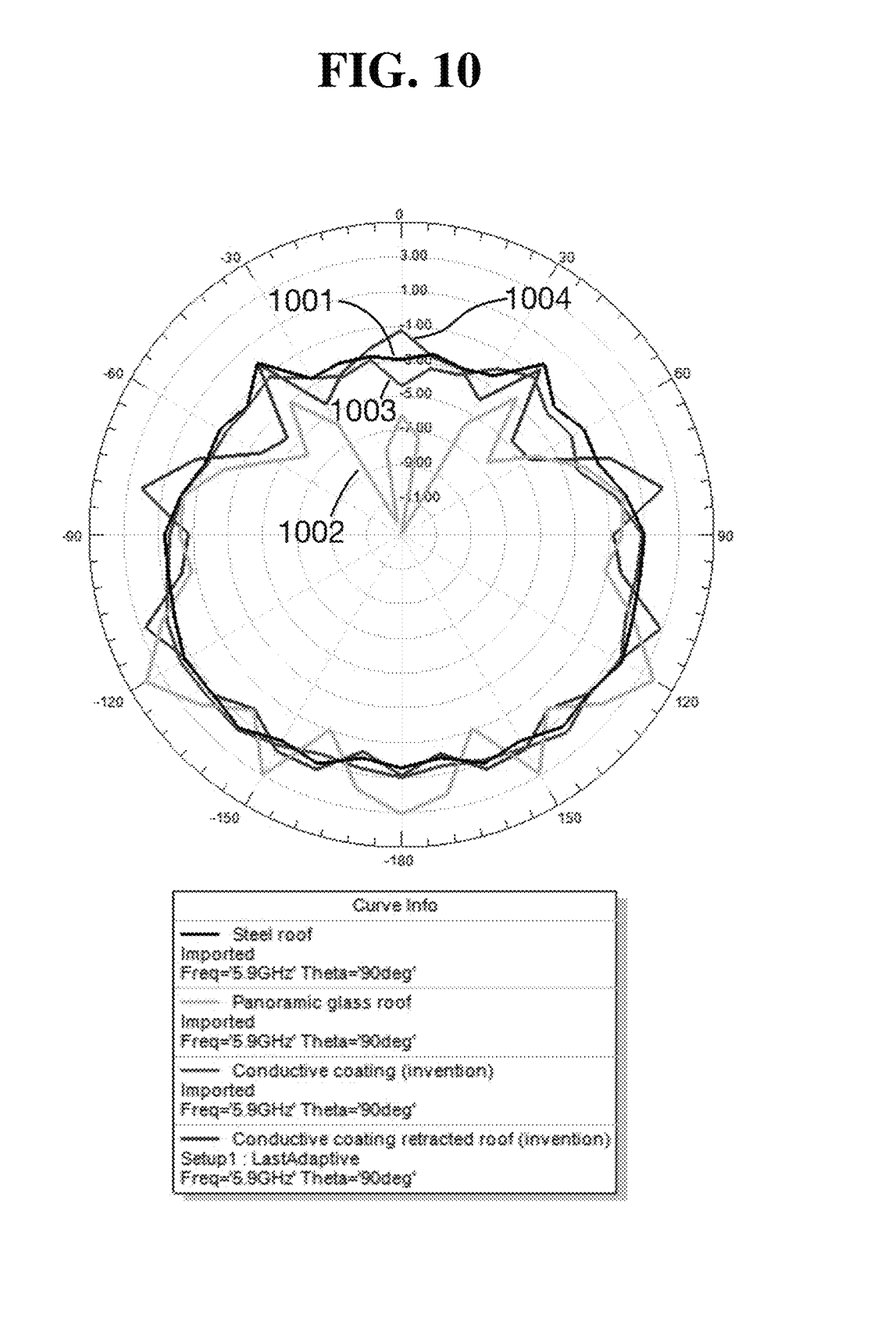
FIG. 10 shows a comparison of simulation results for vehicles having a conventional steel roof, a conventional panoramic glass roof, a glass panel coated with an electrically conductive coating according to an exemplary embodiment of the present disclosure, and a retractable glass panel coated with the electrically conductive coating according to an exemplary embodiment of the present disclosure.

FIG. 10 shows a comparison of simulation results for radiation in the 5.9 GHz frequency band for vehicles having a conventional steel roof, a conventional panoramic glass roof, a glass roof coated with an electrically conductive coating according to an exemplary embodiment of the present disclosure, and a retractable glass roof coated with the electrically conductive coating according to an exemplary embodiment of the present disclosure. Referring to FIG. 10, antenna gains in the forward direction (i.e., 0 deg. azimuth angle) of a conventional steel roof 1001, a conventional glass roof 1002, a conductively coated glass roof 1003 according to the present disclosure, and a conductively coated retractable glass roof 1004 according to the present disclosure are about −3 dB, −6 dB, −4 dB, and −1 dB, respectively. In other words, the conventional glass roof 1002 shows significantly reduced forward gain compared to the conventional steel roof 1001, whereas the conductively coated glass roof 1003 and the conductively coated retractable glass roof 1004 provide similar performance as the conventional steel roof 1001. Therefore, the results shown in FIG. 10 indicate that the vehicle glass roof having a conductive coating improves the performance of antenna radiation.

As described above, the vehicle roof according to the present disclosure may improve the antenna performance without adding any additional antenna devices, for example, at the front side of the vehicle. Since additional antennas increase the overall cost due to additional structures, cables, and hardware, the vehicle roof including the conductive coating may improve the antenna performance without increasing the manufacturing cost of the vehicle. The vehicle roof according to the present disclosure may be applied for various wireless frequency bands including a 4G LTE communication (i.e., 5.9 GHz band), a 5G wireless communication, or the like. Moreover, the present disclosure is not limited to a roof of the vehicle, and may be applied to any glass windows of the vehicle such as, for example, a front windshield, a rear window, and side windows.

Hereinabove, although the present disclosure is described by specific matters such as concrete components, and the like, the exemplary embodiments, and drawings, they are provided merely for assisting in the entire understanding of the present disclosure. Therefore, the present disclosure is not limited to the exemplary embodiment. Various modifications and changes may be made by those skilled in the art to which the disclosure pertains from this description. Therefore, the spirit of the present disclosure should not be limited to the above-described exemplary embodiments, and the following claims as well as all technical spirits modified equally or equivalently to the claims should be interpreted to fall within the scope and spirit of the disclosure.

What is claimed is:
1. A vehicle having a ground plane for an antenna, the ground plane being positioned in front of the antenna,
  wherein the ground plane comprises:
    a glass panel disposed on a roof of the vehicle; and an electrically conductive coating applied to the glass panel, and wherein the conductive coating is electrically connected to an electrically conductive portion of a vehicle body to form the ground plane for the antenna, and wherein the conductive coating is electrically connected to the vehicle body via conductive bristles.

2. The vehicle of claim 1, wherein the conductive coating is electrically connected to the electrically conductive portion of the vehicle body along an entire outer periphery of the glass panel.

3. The vehicle of claim 1, wherein the conductive coating is transparent or translucent.

4. The vehicle of claim 1, wherein the conductive coating includes silver nanowire or indium tin oxide.

5. The vehicle of claim 1, wherein the conductive coating is applied to a portion of the glass panel.

6. The vehicle of claim 1, wherein a gap between the conductive coating and the vehicle body is filled with a filling material or a glue to fix the glass panel to the vehicle body.

7. The vehicle of claim 1, wherein the glass panel includes a plurality of glass panes.

8. The vehicle of claim 7, wherein the conductive coating is applied to at least one of the plurality of glass panes.

9. The vehicle of claim 7, wherein the plurality of glass panes include:
a first glass pane; and
a second glass pane,
wherein the first glass pane is configured to be retracted and disposed over the second glass pane.

10. The vehicle of claim 9, wherein the conductive coating is applied on a bottom surface of the first glass pane and on a top surface of the second glass pane.

11. The vehicle of claim 9, wherein, when the first glass pane is retracted, a vertical gap between the first glass pane and the second glass pane forms a waveguide to guide radiation in an operating frequency band of wireless communication.

12. A vehicle having a ground plane for an antenna, the ground plane being positioned in front of the antenna,
wherein the ground plane comprises,
a glass panel disposed on a roof of the vehicle; and
an electrically conductive coating applied to the glass panel, and
wherein the conductive coating is electrically connected to an electrically conductive portion of a vehicle body to form the ground plane for the antenna, and
wherein the conductive coating extends to and wraps around a peripheral edge of the glass panel.

13. A vehicle having a ground plane for an antenna, the ground plane being positioned in front of the antenna,
wherein the ground plane comprises,
a glass panel disposed on a roof of the vehicle; and
an electrically conductive coating applied to the glass panel, and
wherein the conductive coating is electrically connected to an electrically conductive portion of a vehicle body to form the ground plane for the antenna, and
wherein the conductive coating is applied to an entire surface of the glass panel.

14. The vehicle of claim 13, wherein a thickness of the conductive coating is greater in an area proximate to the antenna than in an area distant from the antenna.

15. A vehicle, comprising:
an antenna disposed on a vehicle roof for transmitting and receiving wireless signals; and
a ground plane for the antenna disposed in front of the antenna,
wherein the ground plane comprises:
a glass panel disposed on the vehicle roof; and
an electrically conductive coating applied to the glass panel, and
wherein the conductive coating is electrically connected to an electrically conductive portion of a vehicle body to form the ground plane for the antenna, and
wherein the conductive coating is electrically connected to the electrically conductive portion of the vehicle body along an entire outer periphery of the glass panel.

16. The vehicle of claim 15, wherein the conductive coating is electrically connected to the vehicle body via conductive bristles.

* * * * *